United States Patent
Bertuzzi et al.

(10) Patent No.: US 10,028,512 B2
(45) Date of Patent: Jul. 24, 2018

(54) APPARATUS FOR FEEDING PASTA SHEET INTO A PASTA-MAKING MACHINE

(71) Applicant: G.D S.p.A., Bologna (IT)

(72) Inventors: Ivanoe Bertuzzi, Casalecchio di Reno (IT); Andrea Biondi, Bologna (IT); Riccardo Ruggeri, Bologna (IT); Enrico Campagnoli, Sant'agata Bolognese (IT); Umberto Zanetti, Modena (IT)

(73) Assignee: G.D S.p.A., Bologna (IT)

( * ) Notice: Subject to any disclaimer, the term of this patent is extended or adjusted under 35 U.S.C. 154(b) by 501 days.

(21) Appl. No.: 14/428,579

(22) PCT Filed: Sep. 25, 2013

(86) PCT No.: PCT/IB2013/058840
§ 371 (c)(1),
(2) Date: Mar. 16, 2015

(87) PCT Pub. No.: WO2014/053952
PCT Pub. Date: Apr. 10, 2014

(65) Prior Publication Data
US 2015/0245625 A1    Sep. 3, 2015

(30) Foreign Application Priority Data
Oct. 3, 2012  (IT) .............. BO2012A0541

(51) Int. Cl.
*A21C 11/10*    (2006.01)
*A21C 3/02*     (2006.01)
*A21C 9/06*     (2006.01)

(52) U.S. Cl.
CPC .............. *A21C 11/10* (2013.01); *A21C 3/024* (2013.01); *A21C 9/063* (2013.01); *Y10T 83/4458* (2015.04); *Y10T 83/4597* (2015.04)

(58) Field of Classification Search
CPC ........... A21C 11/10; A21C 3/024; B26D 5/22; Y10T 83/4458; Y10T 83/4597; B65G 47/31; A21D 8/02
(Continued)

(56) References Cited

U.S. PATENT DOCUMENTS 1,489,167 A * 4/1924 Spiess .................... B65H 20/04
                                                   226/124
5,054,304 A * 10/1991 Hayashi ............... B21D 43/022
                                                    72/131
(Continued)

FOREIGN PATENT DOCUMENTS

CA      1325137    12/1993
CH       309910     9/1955
(Continued)

OTHER PUBLICATIONS

International Search Report dated Feb. 25, 2014 for counterpart App. No. PCT/IB2013/058840.
(Continued)

*Primary Examiner* — Kenneth E. Peterson
*Assistant Examiner* — Nhat Chieu Do
(74) *Attorney, Agent, or Firm* — Shuttleworth & Ingersoll, PLC; Timothy Klima

(57) ABSTRACT

An apparatus for feeding pasta sheet into a pasta-making machine, includes a feed device for feeding a strip of pasta sheet along a predetermined path, and a punching device designed to operate on the strip in the stop condition so as to punch the strip and obtain from the strip cut pieces of pasta sheet intended to be wrapped around respective portions of filling, thereby producing respective pieces of filled pasta. The apparatus includes a speed variator device for the feed speed of the strip, interposed between the feed device and the punching device for causing, during each machine
(Continued)

cycle of the apparatus, a variation in the speed of a branch of the strip positioned at the punching device which, in combination with the speed at which the strip is supplied by the feed device, stops the branch of the strip.

10 Claims, 1 Drawing Sheet

(58) Field of Classification Search
USPC .......... 83/235, 236, 202–233, 263; 99/450.1, 99/450.2, 450.4, 450.5; 426/503, 496
See application file for complete search history.

(56) References Cited

U.S. PATENT DOCUMENTS

| | | | |
|---|---|---|---|
| 5,286,185 A | 2/1994 | Tashiro et al. | |
| 5,853,783 A * | 12/1998 | Rijkaart | A21D 8/02 264/70 |
| 6,003,417 A * | 12/1999 | Finkowski | A21C 11/10 83/155 |
| 6,953,596 B2 * | 10/2005 | Maniak | A21C 11/10 426/503 |
| 2006/0040032 A1 * | 2/2006 | Peitzmeier | A21C 11/002 426/549 |
| 2010/0166482 A1 * | 7/2010 | Gocho | B41J 11/663 400/621 |
| 2013/0205964 A1 * | 8/2013 | Matsushita | B65C 3/065 83/80 |
| 2013/0327235 A1 * | 12/2013 | Rebeaud | B65H 20/24 101/3.1 |

FOREIGN PATENT DOCUMENTS

| | | |
|---|---|---|
| CH | 309910 A | 9/1955 |
| CN | 1048648 | 1/1991 |
| CN | 1111935 | 11/1995 |
| FR | 620380 | 4/1927 |

OTHER PUBLICATIONS

Chinese Office Action dated Jan. 15, 2016 from counterpart CN App No. 201380051243.1.
Chinese Office Action dated Sep. 28, 2016 from counterpart CN App No. 201380051243.1.
Chinese Search Report dated Jan. 7, 2016 from counterpart CN App No. 201380051243.1

* cited by examiner

APPARATUS FOR FEEDING PASTA SHEET INTO A PASTA-MAKING MACHINE

This application is the National Phase of International Application PCT/IB2013/058840 filed Sep. 25, 2013 which designated the U.S.

This application claims priority to Italian Patent Application No. BO2012A000541 filed Oct. 3, 2012, which application is incorporated by reference herein.

TECHNICAL FIELD

This invention relates to an apparatus for feeding pasta sheet into a pasta-making machine.

In particular, this invention relates to an apparatus which is advantageously usable for intermittently feeding a strip of pasta sheet towards preparation stations on a machine for making filled pasta such as tortellini, tortelloni or ravioli.

Hereinafter in this description reference is made, by way of an example and for simplicity, to an apparatus of the above-mentioned type operating in a machine for making filled pasta without thereby restricting the scope of the invention.

BACKGROUND ART

In prior art machines for making filled pasta a continuous strip of pasta sheet is usually intermittently fed towards a station for cutting pieces of sheet which will be filled with a portion of filling. Said intermittent feed is usually obtained by making the strip of pasta pass through a succession of pairs of superposed rollers. The rollers of each pair have their cylindrical surfaces substantially at a tangent to one another, and they have an intermittent rotating motion, in opposite directions, driven by suitable actuator means.

The continuous starts and stops of said rollers and the sudden accelerations and decelerations that the rollers impart to the strip of pasta, in particular in modern machines operating at high speed, cause uneven tensions on the strip of pasta, the consequence being that imprints are impressed on the strip one after another along the strip, having different thickness to that of the remaining portions of the strip. Obviously, said imprints give the cut pieces of sheet an appearance which is not perfectly regular.

DISCLOSURE OF THE INVENTION

The aim of this invention is to provide an apparatus for feeding pasta sheet into a pasta-making machine which is free of the disadvantage described above with reference to the prior art.

Accordingly, this invention provides an apparatus for feeding pasta sheet into a pasta-making machine as disclosed herein.

BRIEF DESCRIPTION OF THE DRAWINGS

This invention will now be described with reference to the accompanying drawings, which illustrate a non-limiting embodiment of it in which.

DETAILED DESCRIPTION OF THE PREFERRED EMBODIMENTS OF THE INVENTION

Figure 2:
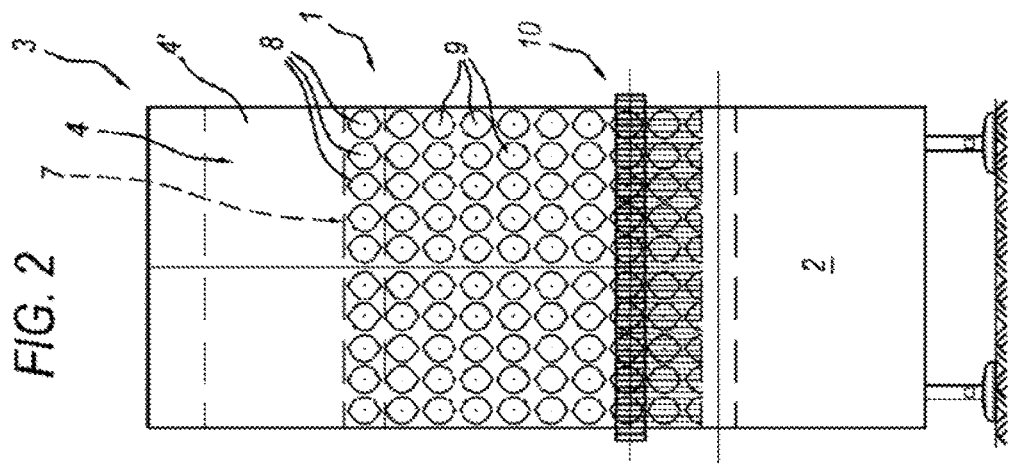
FIGS. 1 and 2 are two schematic front views of a pasta-making machine incorporating an apparatus for feeding pasta sheet made according to this invention.
Figure 1:
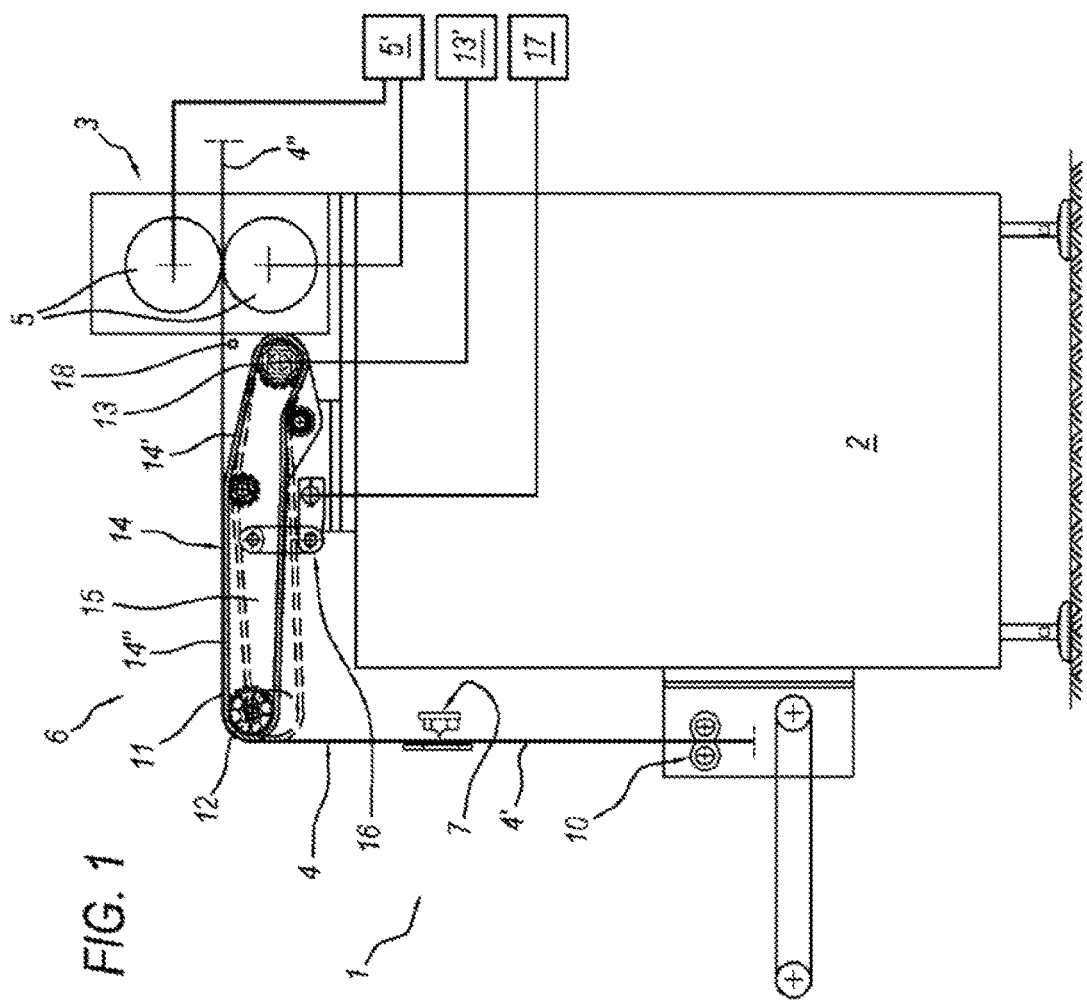

With reference to FIGS. 1 and 2, the numeral 1 denotes in its entirety a pasta-making machine, in particular used for making filled pasts such as tortellini, tortelloni or ravioli.

The machine 1 comprises a base 2, basically comprising a box-shaped body in the form of a parallelepiped, on top of which there is an apparatus 3 for feeding a strip 4 of pasta sheet. Said apparatus 3 comprises feed means comprising two superposed rollers 5, in FIG. 1 positioned at the upper right portion of the machine 1, the rollers being rotatable about respective horizontal axes which are parallel with each other and perpendicular to the plane of the Figures. The rollers 5 have their cylindrical surfaces substantially at a tangent to one another and they are separated from each other by a short stretch whose length is substantially equal to the thickness of the strip 4 of pasta, and they rotate in opposite directions, driven by actuator means schematically illustrated as a block 5'. It should be noticed that in the machine 1 there may also be two or more pairs of rollers 5 one after another along the path followed by the strip 4 of pasta sheet.

Immediately downstream of the rollers 5 with reference to the direction of feed of the strip 4 of pasta, which is fed along a horizontal surface and towards the left in FIG. 1 by the rollers 5, there is a speed variator device 6 for the feed speed of the strip 4, described in more detail below.

Immediately downstream of the device 6 the strip 4 of pasta moves downwards (descending branch of strip 4), and encounters first a punching device 7 of the known type, designed to operate on the strip 4 in the stop condition for punching it and obtaining from it cut pieces 8 of sheet which must then be wrapped around respective portions of filling to produce respective tortellini, tortelloni, ravioli (not illustrated) or other pieces of filled pasta. More precisely, during each machine cycle the punching device performs punching actions in horizontal rows in the strip 4 of pasta, producing as many cut pieces 8.

Downstream of the punching device 7 the strip 4 of pasta, which after the repeated action of the punching device 7 has a plurality of horizontal rows of holes 9 in it, encounters a chopping device 10 of the known type, which cuts it into small fragments which will be recovered and worked into a dough again.

The above-mentioned speed variator device 6 for the feed speed of the strip 4 comprises a conveyor belt 11, looped around (at least) two end pulleys 12 and 13 (left and right in FIG. 1) which are rotatable around respective horizontal axes, parallel with each other and perpendicular to the direction of feed of the strip 4 of pasta arriving from the rollers 5, and comprising an upper, conveyor branch 14 extending mainly along a substantially horizontal line from a zone close to the rollers 5 towards the left in FIG. 1. More precisely, the upper, conveyor branch 14 comprises a first stretch 14' which is angled slightly upwards from the zone of the conveyor belt 11 closest to the rollers 5, and a second, substantially horizontal stretch 14" which connects said angled stretch 14' to the zone where the pulley 12 is located.

The pulley 13 is preferably a driving pulley and is connected to motor means schematically illustrated as a block 13', and the pulley 12 is supported by a frame 15 designed to oscillate in both directions about the axis of rotation of the pulley 13, with a law of motion described below, driven by a kinematic mechanism 16 connected to actuator means schematically illustrated as a block 17.

In use, the strip 4 of pasta arriving from a forming station not illustrated is fed by the rollers 5, which make it advance along a horizontal surface on the upper, conveyor branch 14 of the conveyor belt 11. As already indicated, the frame 15 (and therefore the upper branch 14 of the conveyor belt 11) is made to oscillate cyclically in both directions about the axis of rotation of the pulley 13 in such a way that, during every machine cycle, the oscillation of the strip 4 of pasta combines with the speed at which it is supplied by the rollers 5, and therefore (during the upward oscillation) stops the branch 4' of the strip 4 of pasta positioned at the punching device 7, which is necessary for the punching device 7 to be able to operate on the strip 4 in the stopped condition so as to obtain a row of cut pieces 8 of sheet from it. The conveyor belt 11 constitutes for the strip 4 of pasta a diverter device able to move a portion of it in both directions, cyclically, perpendicularly to the plane in which the strip 4 lies.

It should be noticed that, regarding driving of the strip 4 of sheet and as illustrated in FIG. 1, the speeds with which the strip is 4 fed by the rollers 5 and by the upper branch 14 of the conveyor belt 11 are not necessarily equal and constant. In fact, if there is a small loop of strip 4 of sheet extending downwards between the rollers 5 and the conveyor belt 11, then the motor means 13' associated with the conveyor belt 11 determine the unwinding length per machine cycle whilst the operating speed of the actuator means 5' associated with the rollers 5 is regulated according to the size of the loop checked by a photocell 18. In this way, the strip 4 of sheet is not under tension at its substantially horizontal branch 4", but only at its vertical branch 4', with tension controlled by the motors means (not illustrated) of the chopping device 10.

If, in contrast, no loop of strip 4 of sheet is wanted between the rollers 5 and the conveyor belt 11, then the motor means 13' associated with the conveyor belt 11 must give the conveyor belt 11 a feed speed slightly greater than the speed of the rollers 5, which in this case determine the unwinding length per machine cycle. In such a situation there will be slight dragging between the upper branch 14 of the conveyor belt 11 and the strip 4 of sheet, with consequent tensioning both at its substantially horizontal branch 4" and at its vertical branch 4'.

It should be noticed that the speed variator device 6 described for the feed speed of the strip 4 of pasta sheet could be substituted by any other speed variator device, even of the known type, designed to guarantee that, during each machine cycle, the descending branch of the strip 4 of pasta stops, which is necessary for the punching device 7 to be able to operate on the strip 4 in the stopped condition so as to obtain a row of cut pieces 8 of sheet from it.

The invention claimed is:

1. An apparatus for cutting pasta sheet, comprising:
   at least one feed roller for feeding a strip of pasta sheet along a predetermined path,
   a punching device for operating on the strip in a stop condition to punch the strip and obtain from the strip cut pieces of pasta sheet intended to be wrapped around respective portions of filling, thereby producing respective pieces of filled pasta;
   a speed variator device for variating a feed speed of the strip, the speed variator device being interposed between the at least one feed roller and the punching device for causing, during each machine cycle of the apparatus, a variation in the feed speed of a branch of the strip positioned at the punching device which, in combination with a supply speed at which the strip is supplied by the at least one feed roller, stops the branch of the strip;
   wherein the speed variator device comprises a diverter device for the strip, for moving a portion of the strip in both directions, cyclically, transversely to the predetermined path;
   wherein the diverter device comprises a conveyor belt, looped around at least two end pulleys rotatable around respective horizontal axes, parallel with each other and perpendicular to a direction of feed of the strip, the conveyor belt comprising an upper conveyor branch extending mainly in a horizontal direction for supporting the strip; a first end pulley of the at least two end pulleys being a driving pulley and being associated with a motor, and a second end pulley of the at least two end pulleys being supported by a frame for oscillating in two directions about an axis of rotation of the first end pulley driven by an oscillation actuator.

2. The apparatus according to claim 1, wherein the upper conveyor branch of the conveyor belt comprises a first stretch which is angled slightly upwards from a first zone of the conveyor belt closest to the at least one feed roller, and a second horizontal stretch which connects the first stretch to a second zone where the second end pulley is located.

3. The apparatus according to claim 2, and further comprising:
   a sensor for checking a size of a loop of pasta strip between the at least one feed roller and the speed variator device; the motor causing, for each machine cycle, a length of strip to be advanced;
   a roller actuator associated with the at least one feed roller for driving the at least one roller, an operating speed of the roller actuator being regulated depending on the size of the loop detected by the sensor.

4. The apparatus according to claim 3, wherein the motor associated with the conveyor belt, in use, gives the conveyor belt a speed greater than the supply speed of the at least one feed roller; the at least one feed roller causing, for each machine cycle, a length of strip to be advanced.

5. The apparatus according to claim 4, wherein the at least one feed roller comprises a pair of superposed rollers, rotatable about respective horizontal axes which are parallel with each other, cylindrical surfaces of the pair of superposed rollers being separated from each other by a stretch whose length is equal to a thickness of the strip of pasta; the pair of superposed rollers rotating in opposite directions, driven by the roller actuator.

6. The apparatus according to claim 1, and further comprising:
   a sensor for checking a size of a loop of pasta strip between the at least one feed roller and the speed variator device; the motor causing, for each machine cycle, a length of strip to be advanced;
   a roller actuator associated with the at least one feed roller for driving the at least one roller, an operating speed of the roller actuator being regulated depending on the size of the loop detected by the sensor.

7. The apparatus according to claim 6, wherein the at least one feed roller comprises a pair of superposed rollers, rotatable about respective horizontal axes which are parallel with each other, cylindrical surfaces of the pair of superposed rollers being separated from each other by a stretch whose length is equal to a thickness of the strip of pasta; the pair of superposed rollers rotating in opposite directions, driven by a roller actuator.

8. The apparatus according to claim 1, wherein the motor associated with the conveyor belt, in use, gives the conveyor belt a speed greater than the supply speed of the at least one feed roller; the at least one feed roller causing, for each machine cycle, a length of strip to be advanced.

9. The apparatus according to claim 8, wherein the at least one feed roller comprises a pair of superposed rollers, rotatable about respective horizontal axes which are parallel with each other, cylindrical surfaces of the pair of superposed rollers being separated from each other by a stretch whose length is equal to a thickness of the strip of pasta; the pair of superposed rollers rotating in opposite directions, driven by the roller actuator.

10. The apparatus according to claim 1, wherein the at least one feed roller comprises a pair of superposed rollers, rotatable about respective horizontal axes which are parallel with each other, cylindrical surfaces of the pair of superposed rollers being separated from each other by a stretch whose length is equal to a thickness of the strip of pasta; the pair of superposed rollers rotating in opposite directions, driven by a roller actuator.

\* \* \* \* \*